(12) United States Patent
Kurimoto et al.

(10) Patent No.: US 11,649,192 B2
(45) Date of Patent: May 16, 2023

(54) HONEYCOMB STRUCTURE

(71) Applicant: NGK Insulators, Ltd., Nagoya (JP)

(72) Inventors: Yudai Kurimoto, Chita (JP); Shogo Hirose, Gifu (JP)

(73) Assignee: NGK INSULATORS, LTD., Nagoya (JP)

(*) Notice: Subject to any disclaimer, the term of this patent is extended or adjusted under 35 U.S.C. 154(b) by 0 days.

(21) Appl. No.: 17/163,812

(22) Filed: Feb. 1, 2021

(65) Prior Publication Data

US 2021/0292248 A1    Sep. 23, 2021

(30) Foreign Application Priority Data

Mar. 23, 2020 (JP) .............. JP2020-050742

(51) Int. Cl.
*C04B 38/00*  (2006.01)
(52) U.S. Cl.
CPC ............... *C04B 38/0009* (2013.01)
(58) Field of Classification Search
None
See application file for complete search history.

(56) References Cited

U.S. PATENT DOCUMENTS

| | | | | |
|---|---|---|---|---|
| 8,999,479 B2 * | 4/2015 | Yamada | ............... | B01D 46/247 428/116 |
| 9,890,673 B2 * | 2/2018 | Kuki | ............... | B01D 46/2429 |
| 2005/0107244 A1 * | 5/2005 | Ichikawa | ............... | B01D 53/94 428/116 |
| 2005/0191461 A1 * | 9/2005 | Kasai | ............... | B01D 39/2068 428/116 |

(Continued)

FOREIGN PATENT DOCUMENTS

| JP | 2013-052367 A1 | 3/2013 |
| JP | 2015-144983 A | 8/2015 |

OTHER PUBLICATIONS

Corning; How it Works: Filter and Substrates accessed by waybackmachine (https://web.archive.org/web/20170804205427/https://www.corning.com/worldwide/en/innovation/materials-science/ceramics/how-it-works-filters-and-substrates.html) (accessed Mar. 22, 2022 for capture Aug. 4, 2017), pp. 1-2. (Year: 2017).*

(Continued)

*Primary Examiner* — Elizabeth Collister
(74) *Attorney, Agent, or Firm* — Burr Patent Law, PLLC

(57) ABSTRACT

A honeycomb structure includes a pillar-shaped honeycomb structure body having a porous partition wall disposed to surround a plurality of cells, which serving as fluid through channels extending from a first end face to a second end face, wherein the plurality of cells includes: large opening cells having a large opening area on the first end face and the second end face; and small opening cells having an opening area smaller than that of the large opening cells on the first end face and the second end face, a ratio of an opening diameter of the large opening cells to an opening diameter of the small opening cells is larger than 1.11 and smaller than 1.28, and the opening diameter of the small opening cells is larger than 0.78 mm, and a cell density of the honeycomb structure body is larger than 93 pcs/cm² and smaller than 104 pcs/cm².

5 Claims, 4 Drawing Sheets

(56) References Cited

U.S. PATENT DOCUMENTS

| | | | |
|---|---|---|---|
| 2009/0176053 A1* | 7/2009 | Miyairi | B01D 46/2484 428/116 |
| 2010/0247852 A1* | 9/2010 | Yamada | B01D 46/247 428/116 |
| 2013/0059724 A1 | 3/2013 | Hirose et al. | |
| 2014/0208946 A1* | 7/2014 | He | B01D 46/2459 95/273 |
| 2015/0037220 A1* | 2/2015 | Goto | B01D 46/2466 422/171 |
| 2015/0182900 A1* | 7/2015 | Shibata | B01D 46/247 55/523 |
| 2015/0275725 A1* | 10/2015 | Ichikawa | C04B 35/6316 428/116 |
| 2016/0273426 A1* | 9/2016 | Kuki | B01D 46/2429 |
| 2017/0204760 A1* | 7/2017 | Matsuya | B01D 46/247 |

OTHER PUBLICATIONS

German Office Action (with English translation), German Application No. 10 2021 201 581.6, dated Nov. 12, 2021 (15 pages).
Chinese Office Action dated Feb. 13, 2023 (Application No. 202110166532.2).

\* cited by examiner

US 11,649,192 B2

HONEYCOMB STRUCTURE

The present application is an application based on JP 2020-050742 filed on Mar. 23, 2020 with Japan Patent Office, the entire contents of which are incorporated herein by reference.

BACKGROUND OF THE INVENTION

Field of the Invention

The present invention relates to a honeycomb structure. More particularly, the present invention relates to a honeycomb structure that can be used as a catalyst carrier loading an oxidation catalyst for exhaust gas purification and that can achieve both high cell density and suppression of cell clogging due to soot.

Description of the Related Art

Conventionally, there has been proposed an exhaust gas aftertreatment system and the like using a honeycomb structure to purify harmful substances such as HC, CO, and NOx contained in exhaust gas emitted from an engine of an automobile and so on. As an example, an exhaust gas aftertreatment system for a diesel engine can include an exhaust gas aftertreatment system that includes an oxidation catalyst placed at the forefront stage of an exhaust passage and a diesel particulate filter placed downstream of the oxidation catalyst.

The main role of the oxidation catalyst placed at the forefront stage of the exhaust gas aftertreatment system is to oxidize soot, NO, HC, and CO contained in the exhaust gas. A honeycomb structure is used as a catalyst carrier for loading such an oxidation catalyst (e.g., see Patent Document 1). The honeycomb structure includes a partition wall made of porous ceramics such as cordierite and a plurality of cells defined by the partition wall.

There are two methods of improving the oxidation performance of an oxidation catalyst: a method of increasing an amount of catalyst loaded on a honeycomb structure; and a method of increasing a cell density of the honeycomb structure.

[Patent Document 1] JP-A-2013-052367

Noble metal is used as an oxidation catalyst used for exhaust gas purification. For this reason, the method of increasing the amount of catalyst to improve the oxidation performance of the oxidation catalyst has a problem in tenns of cost and the like. Therefore, as a method of improving the oxidation performance of the oxidation catalyst, various studies are underway on the method of increasing the cell density of the honeycomb structure.

By increasing the cell density of the honeycomb structure, contact area between exhaust gas and a catalyst rises and thus the improvement of oxidation performance is expected. On the other hand, in the honeycomb structure acting as a catalyst carrier, open ends of cells that act as through channels of exhaust gas may be clogged at the inflow end face side by soot contained in the exhaust gas, because the oxidation catalyst is placed at the forefront stage of the exhaust passage. In particular, when the cell density of the honeycomb structure is increased, an opening diameter per one cell becomes small and thus soot is easy to clog the open ends of the cells. For this reason, as a honeycomb structure for a catalyst carrier to load an oxidation catalyst, there has been a demand for the development of a honeycomb structure that can achieve both high cell density and suppression of cell clogging due to soot.

The present invention has been achieved in view of the problems of the above conventional technology. According to the present invention, there is provided a honeycomb structure that can achieve both high cell density and suppression of cell clogging due to soot.

SUMMARY OF THE INVENTION

According to the present invention, there is provided a honeycomb structure to be described below.

[1] A honeycomb structure includes a pillar-shaped honeycomb structure body having a porous partition wall disposed so as to surround a plurality of cells, which serving as fluid through channels extending from a first end face to a second end face, wherein,
the plurality of cells includes: large opening cells having a large opening area on the first end face and the second end face; and small opening cells having an opening area smaller than that of the large opening cells on the first end face and the second end face,
a ratio "L1/L2" of an opening diameter L1 of the large opening cells to an opening diameter L2 of the small opening cells is larger than 1.11 and smaller than 1.28, and the opening diameter L2 of the small opening cells is larger than 0.78 mm,
a cell density of the honeycomb structure body is larger than 93 pcs/cm$^2$ and smaller than 104 pcs/cm$^2$.

[2] The honeycomb structure according to [1], wherein a thickness of the partition wall is 0.084 to 0.094 mm.

[3] The honeycomb structure according to [1] or [2], wherein a porosity of the partition wall is 30 to 37%.

[4] The honeycomb structure according to any one of [1] to [3], wherein an average pore diameter of the partition wall is 4.0 to 6.0 µm.

Effects of the Invention

The honeycomb structure according to the present invention can achieve both high cell density and suppression of cell clogging due to soot. In other words, the honeycomb structure of the present invention is a honeycomb structure in which large opening cells having an opening diameter L1 and small opening cells having an opening diameter L2 are mixed. Herein, L1/L2 is larger than 1.11 and smaller than 1.28 and the opening diameter L2 of the small opening cells is larger than 0.78 mm. Moreover, in the honeycomb structure of the present invention, the cell density is larger than 93 pcs/cm$^2$ and smaller than 104 pcs/cm$^2$. With such a configuration, it is possible to effectively suppress cell clogging due to soot even if the honeycomb structure realizes high cell density. The honeycomb structure of the present invention can be extremely effectively used as a honeycomb structure for a catalyst carrier to load an oxidation catalyst.

DESCRIPTION OF THE PREFERRED EMBODIMENTS

Hereinafter, embodiments of the present invention will be described. However, the present invention is not limited to the following embodiments. Therefore, it should be understood that one in which appropriate modifications, improvements and the like are added to the following embodiments based on the ordinary knowledge of those skilled in the art without departing from the spirit of the present invention is also within the scope of the present invention.

(1) Honeycomb Structure

Figure 1:
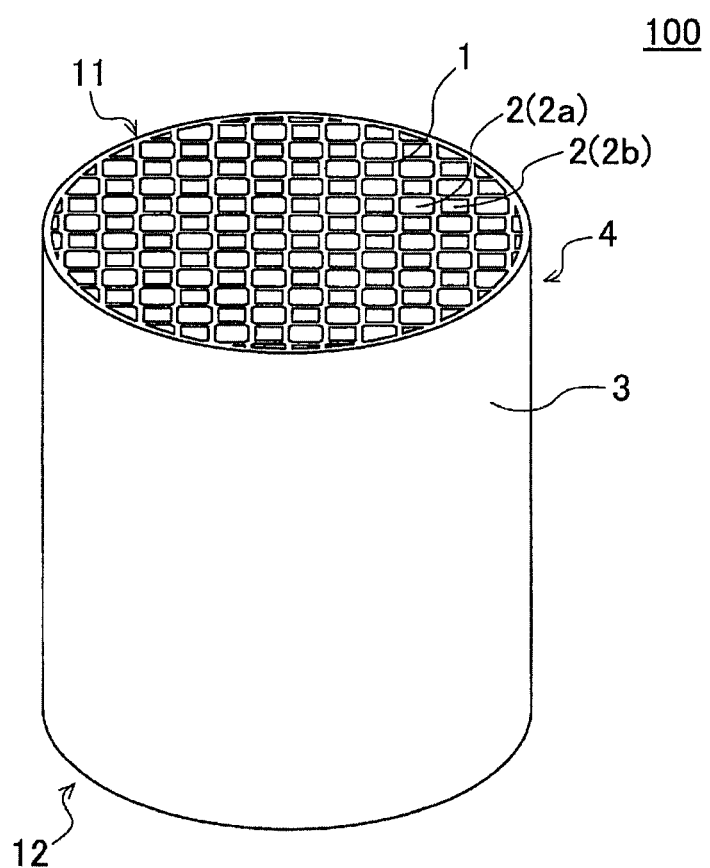
FIG. 1 is a perspective view schematically showing one embodiment of a honeycomb structure of the present invention viewed from the inflow end face side.
Figure 2:
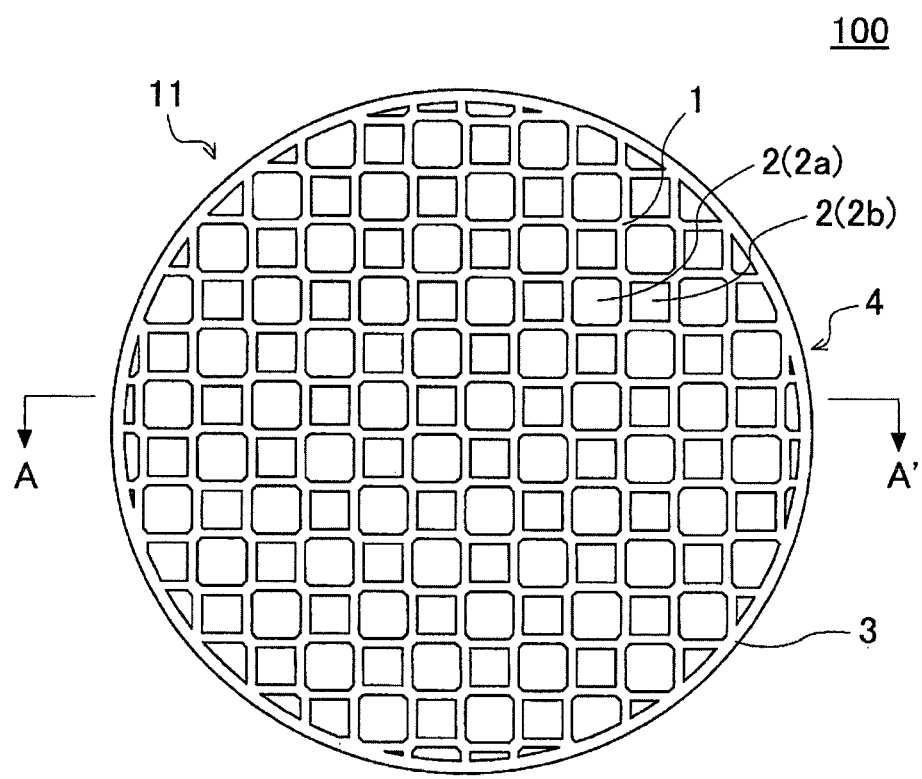
FIG. 2 is a plan view of the honeycomb structure shown in FIG. 1 viewed from the first end face side.
Figure 3:
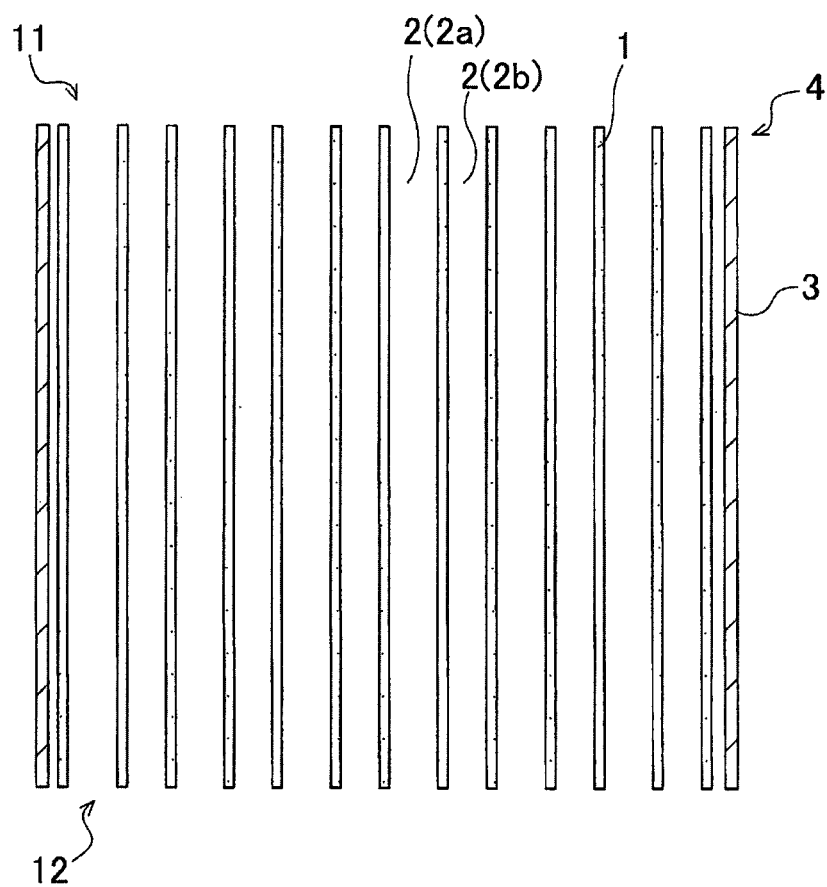
FIG. 3 is a sectional view schematically showing the section taken along the line A-A' in FIG. 2.

One embodiment of the honeycomb structure of the present invention is a honeycomb structure 100 that includes a pillar-shaped honeycomb structure body 4 having a porous partition wall 1 disposed so as to surround a plurality of cells 2 as shown in FIGS. 1 to 3. The plurality of cells 2 are defined by the partition wall 1 to extend from a first end face 11 to a second end face 12 of the pillar-shaped honeycomb structure body 4. In the present invention, each of the cells 2 means a space surrounded by the partition wall 1, and the plurality of cells 2 formed in the honeycomb structure body 4 act as through channels of fluid such as exhaust gas. In the honeycomb structure 100 according to the present embodiment, the pillar-shaped honeycomb structure body 4 further includes a circumferential wall 3 on the circumferential side face. In other words, the circumferential wall 3 is provided to encompass the partition wall 1 provided in a grid pattern.

Figure 4:
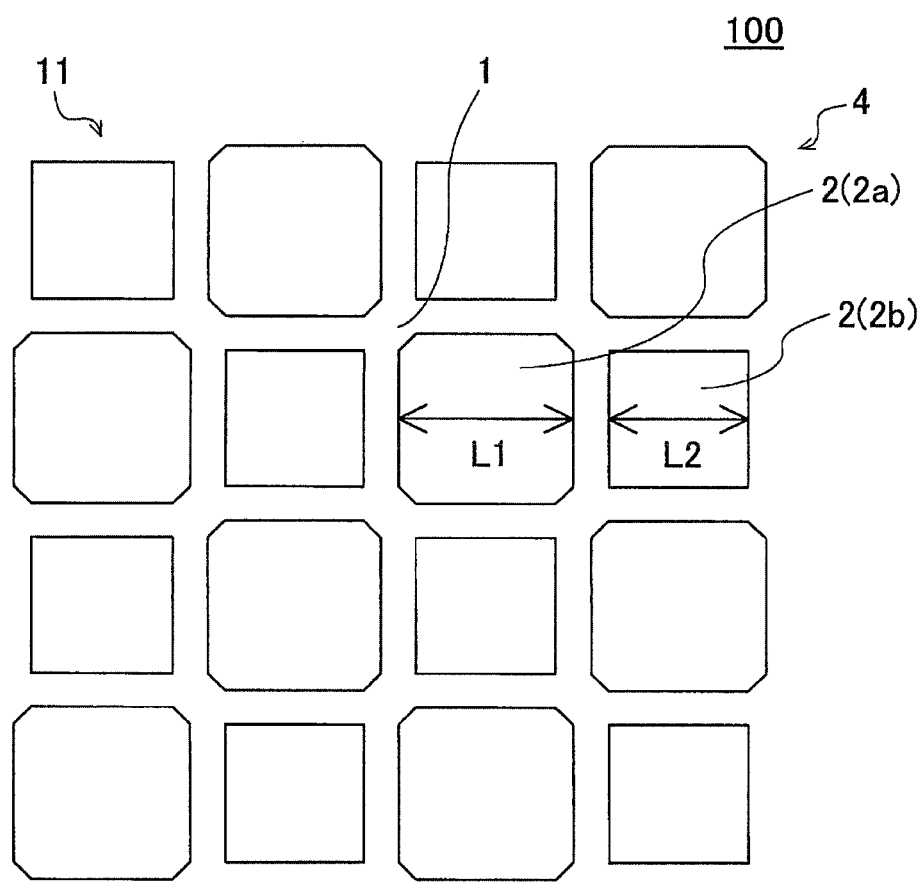
FIG. 4 is an enlarged plan view in which a part of the first end face of the honeycomb structure shown in FIG. 2 is enlarged.

FIG. 1 is a perspective view schematically showing one embodiment of the honeycomb structure according to the present invention, viewed from the inflow end face side. FIG. 2 is a plan view of the honeycomb structure shown in FIG. 1, viewed from the first end face side. FIG. 3 is a sectional view schematically showing the section taken along the line A-A' in FIG. 2. FIG. 4 is an enlarged plan view in which a part of the first end face of the honeycomb structure shown in FIG. 2 is enlarged.

As shown in FIGS. 1 to 4, the plurality of cells 2 are configured to include large opening cells 2a having a large opening area on the first end face 11 and the second end face 12 and small opening cells 2b having an opening area smaller than that of the large opening cells 2a on the first end face 11 and the second end face 12. In addition, in the honeycomb structure 100 according to the present embodiment, the plurality of cells 2 composed of the large opening cells 2a and the small opening cells 2b are cells 2 of which peripheral edges are surrounded by only the partition wall 1. Hereinafter, the cell 2 of which the peripheral edge is surrounded by only the partition wall 1 may be called a "complete cell". On the other hand, when the circumferential wall 3 is provided on the circumferential side face of the honeycomb structure body 4, outermost cells 2 of the honeycomb structure body 4 are cells 2 that are surrounded by the partition wall 1 and the circumferential wall 3. Each of the outermost cells 2 is an incomplete cell 2 of which a portion of the peripheral edge of cells 2 is defined by the circumferential wall 3 and in which a portion of a complete cell is defected. The cell 2 of which the peripheral edge is surrounded by the partition wall 1 and the circumferential wall 3 may be called an "incomplete cell". Such the incomplete cells are not included in the cells 2 that constitute the large opening cells 2a and the small opening cells 2b.

In the honeycomb structure 100 according to the present embodiment, a ratio of an opening diameter L1 of the large opening cells 2a to an opening diameter L2 of the small opening cells 2b is larger than 1.11 and smaller than 1.28. Moreover, the opening diameter L2 of the small opening cells 2b is larger than 0.78 mm. Furthermore, the cell density of the honeycomb structure body 4 is larger than 93 pcs/cm$^2$ and smaller than 104 pcs/cm$^2$. Hereinafter, the ratio of the opening diameter L1 of the large opening cells 2a to the opening diameter L2 of the small opening cells 2b may be called an "opening diameter ratio L1/L2".

The honeycomb structure 100 according to the present embodiment can achieve both high cell density and suppression of clogging of the cells 2 due to soot. In particular, even if the honeycomb structure 100 is a honeycomb structure with high cell density of which the cell density is larger than 93 pcs/cm$^2$, it is possible to effectively suppress cell clogging due to soot by setting the opening diameter ratio L1/L2 into the above numeric range. For example, because all the cells of the conventional honeycomb structure for a catalyst carrier to load an oxidation catalyst have the same size, the influence of cell clogging due to soot is enormous when high cell density is achieved. Meanwhile, the honeycomb structure 100 according to the present embodiment can particularly effectively suppress the clogging of the large opening cells 2a due to soot by mixing the large opening cells 2a and the small opening cells 2b.

If the opening diameter L1 of the large opening cells 2a is increased, resistance to the clogging of the cells 2 can be increased. On the other hand, when the opening diameter L1 of the large opening cells 2a is extremely increased and a difference between the opening diameter L1 and the opening diameter L2 of the small opening cells 2b becomes large, a cell structure of the honeycomb structure body 4 becomes distorted and the isostatic strength of the honeycomb structure 100 is decreased. Therefore, when the opening diameter ratio L1/L2 is 1.28 or more, the isostatic strength of the honeycomb structure 100 is decreased. When the opening diameter ratio L1/L2 is 1.11 or less, the effect of increasing the resistance to the clogging of the cells 2 is not sufficiently exhibited.

If the opening diameter ratio L1/L2 is larger than 1.11 and smaller than 1.28, it has no particular limitation. However, it is preferable that the opening diameter ratio is 1.14 or more and 1.27 or less, for example.

The opening diameter L2 of the small opening cells 2b is larger than 0.78 mm. If the opening diameter L2 of the small opening cells 2b is 0.78 mm or less, a rate of increase in pressure loss due to the clogging of the cells 2 becomes large when the opening diameter ratio L1/L2 is set into the above numeric range. Herein, the rate of increase in pressure loss means a rate of increase in pressure loss before and after the clogging of the cells 2 when the pressure loss of the honeycomb structure 100 is increased by clogging the cells 2 with soot.

The opening diameter L1 of the large opening cells 2a is a value measured by the following method. In the opening shape of the large opening cells 2a, a side having the maximum length is found among sides constituting the outline of the opening shape. Then, a diameter at which the width of the opening shape of the large opening cells 2a in the direction perpendicular to this maximum length side is maximized is regarded as "the opening diameter L1 of the large opening cells 2a". Moreover, the opening diameter L2 of the small opening cells 2b is a value measured by the following method. In the opening shape of the small opening cells 2b, a side having the maximum length is found among sides constituting the outline of the opening shape. Then, a diameter at which the width of the opening shape of the small opening cells $2b$ in the direction perpendicular to this maximum length side is maximized is regarded as "the opening diameter L2 of the small opening cells $2b$".

If the cell density of the honeycomb structure body 4 is larger than 93 pcs/cm$^2$ and smaller than 104 pcs/cm$^2$, it has no particular limitation. However, it is preferable that the cell density is 94 pcs/cm$^2$ or more and 102 pcs/cm$^2$ or less. It is further preferable that the cell density is 95 pcs/cm$^2$ or more and 100 pcs/cm$^2$ or less. When the cell density is 93 pcs/cm$^2$ or less, it is difficult to realize high cell density for the improvement of oxidation performance. When the cell density is 104 pcs/cm$^2$ or more, it is not preferable because the opening diameter L2 of the small opening cells $2b$ cannot be secured.

A value larger than 0.78 mm suffices for the opening diameter L2 of the small opening cells $2b$. An appropriate value is determined for the upper limit of the value based on the numeric ranges of "the opening diameter ratio L1/L2" and "the cell density" explained so far. The upper limit of the opening diameter L2 of the small opening cells $2b$ may be 0.88 mm, for example.

The thickness of the partition wall 1 has no particular limitation, but for example, it is preferably 0.084 to 0.094 mm and is further preferably 0.089 to 0.091 mm. The thickness of the partition wall 1 can be measured by using a scanning electron microscope or a microscope, for example. The honeycomb structure 100 can be particularly preferably used as a catalyst carrier that loads an oxidation catalyst for exhaust gas purification by setting the thickness of the partition wall 1 into the above numeric range.

The porosity of the partition wall 1 has no particular limitation, but for example, it is preferably 30 to 37% and is further preferably 32 to 35%. The porosity of the partition wall 1 is a value measured by the mercury press-in method. The measurement of the porosity of the partition wall 1 can be performed by using Autopore 9500 (product name) manufactured by Micromeritics, for example. The measurement of the porosity can be performed, after cutting out a portion of the partition wall 1 from the honeycomb structure body 4 as a test piece, by using the test piece obtained in this way. The honeycomb structure 100 can be particularly preferably used as a catalyst carrier that loads an oxidation catalyst for exhaust gas purification by setting the porosity of the partition wall 1 into the above numeric range.

The average pore diameter of the partition wall 1 has no particular limitation, but for example, it is preferably 4.0 to 6.0 μm and is further preferably 4.3 to 5.8 μm. The average pore diameter of the partition wall 1 is a value measured by the mercury press-in method. The measurement of the average pore diameter of the partition wall 1 can be performed by using Autopore 9500 (product name) manufactured by Micromeritics, for example. The measurement of the average pore diameter can be performed by using the above test piece for measuring the porosity. The honeycomb structure 100 can be particularly preferably used as a catalyst carrier that loads an oxidation catalyst for exhaust gas purification by setting the average pore diameter of the partition wall 1 into the above numeric range.

The shape of the cells 2 formed in the honeycomb structure body 4 has no particular limitation. For example, "the shape of the cells 2" on a cross section orthogonal to the direction of extension of the cells 2 of the honeycomb structure body 4 can include a polygonal shape such as a triangle, a quadrangle, a pentagon, a hexagon, and an octagon. Hereinafter, "the shape of the cells 2" on a cross section orthogonal to the direction of extension of the cells 2 of the honeycomb structure body 4 may be called a "cell shape". In FIGS. 1 to 4, the cell shape of the small opening cells $2b$ is a "quadrangle", and the cell shape of the large opening cells $2a$ is an "octagon". As shown in FIGS. 1 to 4, the cell shape of the small opening cells $2b$ and the cell shape of the large opening cells $2a$ may be different from each other. Although it is not shown, the cell shapes of both may be similar. In addition, as shown in FIGS. 1 to 4, when the cell shape of the small opening cells $2b$ is a "quadrangle" and the cell shape of the large opening cells $2a$ is an "octagon", it is preferable that the cell shape of the large opening cells $2a$ is an "octagon" formed as follows. In other words, it is preferable that the cell shape of the large opening cells $2a$ is an "octagon" formed by enlarging the length of each side of a quadrangle that is the cell shape of the small opening cells $2b$ to be more than 1.11 times and less than 1.28 times and by chamfering the four corners of the enlarged quadrangle.

It is preferable that the large opening cells $2a$ and the small opening cells $2b$ are alternately arranged, while interposing the partition wall 1 therebetween, on the first end face 11 side and the second end face 12 side of the honeycomb structure body 4. For example, as shown in FIG. 2, when the plurality of cells 2 have a cell structure in which the cells are arrayed along the left-right direction and the up-down direction on the page of FIG. 2, it is preferable that the large opening cells $2a$ and the small opening cells $2b$ are alternately arranged while interposing the partition wall 1 therebetween in the array of the cells in each direction.

The material of the partition wall 1 has no particular limitation. For example, it is preferable that the material of the partition wall 1 includes at least one selected from a group consisting of silicon carbide, cordierite, silicon-silicon carbide composite material, cordierite-silicon carbide composite material, silicon nitride, mullite, alumina, and aluminum titanate.

The circumferential wall 3 of the honeycomb structure body 4 may be integrally formed with the partition wall 1 or may be a circumferential coating layer formed by applying a circumferential coating material to the circumferential side of the partition wall 1. For example, although it is not shown, during the manufacturing, the partition wall and the circumferential wall may be integrally formed, and then the formed circumferential wall may be removed by a well-known method such as grinding. Then, the circumferential coating layer may be provided on the circumferential side of the partition wall.

The shape of the honeycomb structure body 4 has no particular limitation. The shape of the honeycomb structure body 4 can include a pillar shape in which the shape of the first end face 11 (e.g., inflow end face) and the second end face 12 (e.g., outflow end face) is a circular shape, an elliptical shape, a polygonal shape, or the like.

The sizes of the honeycomb structure body 4, for example, the length from the first end face 11 to the second end face 12 and the size of a section orthogonal to the extending direction of the cells 2 of the honeycomb structure body 4 have no particular limitation. When the honeycomb structure 100 is used as a catalyst carrier that loads an oxidation catalyst, the above sizes may be selected appropriately to obtain optimum purification performance.

(2) Method for Manufacturing Honeycomb Structure

A method for manufacturing the honeycomb structure according to the present invention has no particular limitation, and can include the following method, for example. First, a plastic kneaded material to make a honeycomb structure is prepared.

The kneaded material to make the honeycomb structure can be prepared by appropriately adding an additive such as binder, a pore former, and water to a material selected as raw material powder from among the above preferable materials of the partition wall.

Next, a pillar-shaped honeycomb formed body, which includes the partition wall defining the plurality of cells and the circumferential wall disposed to encompass the partition wall, is manufactured by performing extrusion on the kneaded material obtained in this way. In the extrusion, a die for extrusion can employ a die in which slits having the inverted shape of the honeycomb formed body to be molded are provided on the extruded surface of the kneaded material. In particular, when manufacturing the honeycomb structure according to the present invention, it is preferable that a die for extrusion employs a die in which slits for forming large opening cells and small opening cells having the respective predetermined opening diameters are provided in the honeycomb formed body to be extruded. Next, the obtained honeycomb formed body is dried by using a microwave and hot air, for example.

Next, the honeycomb structure of the present invention is manufactured by firing the obtained honeycomb formed body. A firing temperature and a firing environment are different depending on a raw material, and those skilled in the art can select the most suitable firing temperature and firing environment for the selected material.

EXAMPLES

Hereinafter, the present invention will be described in further detail based on Examples, but the present invention is not limited to these Examples.

Example 1

A kneaded material was prepared by adding a pore former of 0.3 parts by mass, a dispersing medium of 1.0 part by mass, and an organic binder of 5.8 parts by mass to a cordierite forming raw material of 100 parts by mass and by mixing and kneading these. Methylcellulose was employed as the organic binder. Potassium laurate was employed as the dispersing agent. Hollow resin particles having an average particle diameter of 28 μm were employed as the pore former.

Next, a honeycomb formed body was manufactured by molding the obtained kneaded material by using an extruder. Next, the obtained honeycomb formed body was dried with high frequency dielectric heating and then was further dried with a hot-air drying machine. The honeycomb formed body was configured to include large opening cells having a large opening area and small opening cells having an opening area smaller than that of the large opening cells, as a plurality of cells defined by a partition wall. The cell shape of the small opening cells was a quadrangle, and the cell shape of the large opening cells was an octagon. The cell shape of the large opening cells is an octagon formed by enlarging the length of each side of a quadrangle that is the cell shape of the small opening cells to be 1.22 times and by chamfering the four corners of the quadrangle. The large opening cells and the small opening cells were alternately arranged on the end face side of the honeycomb formed body while interposing the partition wall therebetween.

Next, the obtained honeycomb formed body was dried with a microwave dryer and was further completely dried with the hot-air dryer and then the honeycomb formed body was adjusted to a predetermined size by cutting both end faces. Next, a honeycomb structure according to Example 1 was manufactured by degreasing and firing the dried honeycomb formed body.

The honeycomb structure according to Example 1 had the end face diameter of 228.6 mm and the length of 76.2 mm in the extending direction of the cells. Moreover, the thickness of the partition wall was 0.089 mm and the cell density was 100 pcs/cm$^2$. The results are shown in Table 1.

For the honeycomb structure according to Example 1, the porosity and the average pore diameter of the partition wall were measured by the following method. Moreover, the opening diameter L1 of the large opening cells and the opening diameter L2 of the small opening cells were measured. The results are shown in Table 1. In Table 1, a column of "L1/L2" shows a ratio of the opening diameter L1 of the large opening cells to the opening diameter L2 of the small opening cells.

TABLE 1

|  | Honeycomb structure body | | Partition wall thickness mm | Cell density pcs/cm$^2$ | Porosity % | Average pore diameter μm | Opening diameter L1 of large opening cell mm | Opening diameter L2 of small opening cell mm | L1/L2 |
|---|---|---|---|---|---|---|---|---|---|
|  | End face diameter mm | Length mm |  |  |  |  |  |  |  |
| Example 1 | 228.6 | 76.2 | 0.089 | 100 | 33 | 5.2 | 1.00 | 0.82 | 1.22 |
| Example 2 | 228.6 | 76.2 | 0.091 | 95 | 30 | 4.3 | 1.03 | 0.84 | 1.22 |
| Example 3 | 228.6 | 76.2 | 0.089 | 94 | 37 | 6.0 | 1.03 | 0.85 | 1.21 |
| Example 4 | 228.6 | 76.2 | 0.084 | 94 | 35 | 5.5 | 1.05 | 0.85 | 1.24 |
| Example 5 | 228.6 | 76.2 | 0.091 | 94 | 34 | 5.8 | 1.00 | 0.88 | 1.14 |
| Example 6 | 228.6 | 76.2 | 0.089 | 94 | 35 | 4.0 | 1.05 | 0.83 | 1.27 |
| Example 7 | 228.6 | 76.2 | 0.091 | 102 | 32 | 5.2 | 1.00 | 0.80 | 1.25 |
| Comp. Ex. 1 | 228.6 | 76.2 | 0.089 | 93 | 33 | 4.6 | 1.00 | 0.90 | 1.11 |
| Comp. Ex. 2 | 228.6 | 76.2 | 0.091 | 104 | 34 | 5.2 | 1.00 | 0.78 | 1.28 |
| Comp. Ex. 3 | 228.6 | 76.2 | 0.089 | 93 | 33 | 5.0 | 0.95 | 0.95 | 1.00 |

(Porosity)

The porosity of the partition wall was measured by using Autopore 9500 (product name) manufactured by Micromeritics. In the measurement of the porosity, after cutting out a portion of the partition wall from the honeycomb structure as a test piece, the porosity was measured by using the obtained test piece.

(Average Pore Diameter)

The average pore diameter of the partition wall was measured by using Autopore 9500 (product name) manufactured by Micromeritics. The average pore diameter was also measured using the test piece used for the measurement of the porosity.

For the honeycomb structure according to Example 1, a rate of increase in pressure loss, purification performance, and isostatic strength were measured by the following method. Results are shown in Table 2.

(Rate of Increase in Pressure Loss)

First, a pressure difference (pressure loss P1) between the first end face and the second end face in the state of 25° C. was calculated for the honeycomb structure. Next, soot was attached to each end face of the honeycomb structure for 3 hours by using a soot generator that forcibly generates soot. Operating conditions of the soot generator were an entering gas temperature of 200° C. and a gas flow rate of 1.5 $Nm^3/min$. Then, a pressure difference (pressure loss P2) between the first end face and the second end face was calculated for the honeycomb structure to which soot attached as described above. A ratio (%) of the pressure loss P2 when the pressure loss P1 is 100% is defined as a rate of increase in pressure loss. The case where a rate of increase in pressure loss is less than 250% is determined as "Pass", and the case where it is not less than 250% is determined as "Fail".

(Purification Performance)

First, the honeycomb structure was dipped in $Al_2O_3$ sol containing noble metal, and $Al_2O_3$ sol and noble metal were attached to the honeycomb structure. Next, a honeycomb structure with catalyst that loads a catalyst was manufactured by baking the $Al_2O_3$ sol and noble metal onto the honeycomb structure. Then, the manufactured honeycomb structure with catalyst was mounted on an exhaust system of an engine bench equipped with the 8 L diesel engine. In this engine bench, an amount of emission of hydrocarbon (HC) in exhaust gas when being driven in the European regulation driving mode was measured. A column of "Purification performance" in Table 2 shows an HC purification rate in which a value obtained by dividing a value obtained by subtracting an amount of HC in gas emitted from the honeycomb structure from an amount of HC emitted from the engine by the amount of HC emitted from the engine is multiplied by 100. The case where the value of the purification rate in the column of "Purification performance" in Table 2 exceeds 88.0% is determined as "Pass".

(Isostatic Strength)

The isostatic strength was measured based on an isostatic breaking strength test regulated by M505-87 of automotive standards (JASO standards) issued by Society of Automotive Engineers of Japan, Inc. The isostatic breaking strength test is a test in which the honeycomb structure is put in a rubber tubular container, is covered with an aluminum plate, and is subjected to isotropic pressure compression underwater. The isostatic strength measured by the isostatic breaking strength test is shown by a pressurized pressure value (MPa) when the honeycomb structure is broken. The case where the isostatic strength is not less than 1.0 MPa is determined as "Pass", and the case where it is less than 1.0 MPa is determined as "Fail".

TABLE 2

|  | Rate of increase in pressure loss % | Purification performance % | Isostatic strength MPa |
|---|---|---|---|
| Example 1 | 247 | 89.3 | 2.5 |
| Example 2 | 239 | 88.3 | 2.5 |
| Example 3 | 239 | 88.3 | 2.8 |
| Example 4 | 236 | 88.2 | 2.0 |
| Example 5 | 241 | 88.2 | 3.5 |
| Example 6 | 238 | 88.3 | 1.0 |
| Example 7 | 249 | 89.5 | 1.5 |
| Comp. Ex. 1 | 240 | 88.0 | 3.8 |
| Comp. Ex. 2 | 252 | 89.9 | 0.9 |
| Comp. Ex. 3 | 250 | 88.0 | 4.0 |

Examples 2 to 7, Comparative Examples 1 to 3

Honeycomb structures were manufactured in the same manner as in Example 1 except for changing the constitution of the honeycomb structure as shown in Table 1.

For the honeycomb structures of Examples 2 to 7 and Comparative Examples 1 to 3, a rate of increase in pressure loss, purification performance, and isostatic strength were measured in the same manner as in Example 1. Results are shown in Table 2.

(Result)

The honeycomb structures of Examples 1 to 7 had low rates of increase in pressure loss and suppressed cell clogging due to soot. Moreover, the honeycomb structures of Examples 1 to 7 realized high cell density and had excellent purification performance. Furthermore, the honeycomb structures of Examples 1 to 7 showed high isostatic strengths. The honeycomb structures of Comparative Examples 1 and 3 had inferior purification performance compared to the honeycomb structures of Examples 1 to 7. It was found that the honeycomb structure of Comparative Example 2 has a large rate of increase in pressure loss and has the large influence of cell clogging due to soot. Moreover, the honeycomb structure of Comparative Example 2 showed low isostatic strength.

INDUSTRIAL APPLICABILITY

The honeycomb structures according to the present invention can be used as a catalyst carrier that loads an oxidation catalyst for exhaust gas purification.

DESCRIPTION OF REFERENCE NUMERALS

1: partition wall, 2: cell, 2a: large opening cell, 2b: small opening cell, 3: circumferential wall, 4: honeycomb structure body, 11: first end face, 12: second end face, 100: honeycomb structure.

What is claimed is:
1. A honeycomb structure comprising:
 a pillar-shaped honeycomb structure body having a porous partition wall disposed so as to surround a plurality of cells, which serve as fluid through channels extending from a first end face to a second end face and are open from the first end face to the second end face without being plugged, and an oxidation catalyst for exhaust gas purification loaded on the porous partition wall surrounding the plurality of cells which are open from the first end face to the second end face without being plugged, wherein the plurality of cells includes: large opening cells having a large opening area on the first end face and the second end face; and small opening cells having an opening area smaller than that of the large opening cells on the first end face and the second end face, a ratio "L1/L2" of an opening diameter L1 of the large opening cells to an opening diameter L2 of the small opening cells is 1.14 or more and 1.21 or less, and the opening diameter L2 of the small opening cells is larger than 0.78 mm, a cell density of the honeycomb structure body is larger than 93 pcs/cm$^2$ and smaller than 104 pcs/cm$^2$.

2. The honeycomb structure according to claim 1, wherein a thickness of the partition wall is 0.084 to 0.094 mm.

3. The honeycomb structure according to claim 1, wherein a porosity of the partition wall is 30 to 37%.

4. The honeycomb structure according to claim 1, wherein an average pore diameter of the partition wall is 4.0 to 6.0 μm.

5. The honeycomb structure according to claim 1, wherein the honeycomb structure has an isostatic strength of 2.5 MPa or more.

* * * * *